(12) United States Patent
Bonin

(10) Patent No.: US 6,839,001 B1
(45) Date of Patent: Jan. 4, 2005

(54) SAFETY STROBE LIGHT

(76) Inventor: Walter E. Bonin, P.O. Box 980483, West Sacramento, CA (US) 95798

( * ) Notice: Subject to any disclaimer, the term of this patent is extended or adjusted under 35 U.S.C. 154(b) by 348 days.

(21) Appl. No.: 10/215,589

(22) Filed: Aug. 9, 2002

(51) Int. Cl.[7] ............................................... G08G 1/095
(52) U.S. Cl. .................... 340/908; 340/908.1; 340/473; 340/693.1; 116/63 P; 116/63 T; 362/157; 362/226; 315/200 A; 320/115
(58) Field of Search ............................... 340/908, 908.1, 340/471, 472, 473, 321, 331, 332, 333, 636.1, 656, 693.1, 693.2; 116/63 R, 63 P, 63 T; 362/157, 20, 800, 226, 162, 181, 182, 183; 315/200 A; 320/115, 107, 110, 114

(56) References Cited

U.S. PATENT DOCUMENTS

| | | | |
|---|---|---|---|
| 2,905,863 A | * | 9/1959 | Martin et al. ............... 315/183 |
| 4,613,847 A | | 9/1986 | Scolari et al. |
| 4,645,168 A | * | 2/1987 | Beard ......................... 248/548 |
| D314,161 S | | 1/1991 | Kondo |
| 5,315,777 A | | 5/1994 | Fogelman |
| 5,356,343 A | | 10/1994 | Lovetere |
| 5,446,345 A | | 8/1995 | Halabi et al. |
| 5,606,309 A | | 2/1997 | Smith |
| 5,627,513 A | * | 5/1997 | Weed et al. ................ 340/473 |
| 5,651,636 A | * | 7/1997 | Yeh ............................... 404/9 |
| 5,963,126 A | | 10/1999 | Karlin et al. |

* cited by examiner

Primary Examiner—Donnie L. Crosland

(57) ABSTRACT

An emergency light includes a base that is elongated and has a top surface and a bottom surface. The base has a pair of oppositely positioned side edges, the top surface has an elongated slot therein orientated generally parallel to the side edges. A light support includes a bottom section that has a lower side that has an elongated ridge thereon. The ridge is removably positionable into the slot for supporting the light support on the base in an upright manner. A strobe light is attached to the light support. A power supply is positioned in the light support and is electrically coupled to the strobe light. The power supply is electrically coupled to an electrical conduit on the ridge. A recharging station is adapted for receiving the ridge for recharging the power supply.

7 Claims, 4 Drawing Sheets

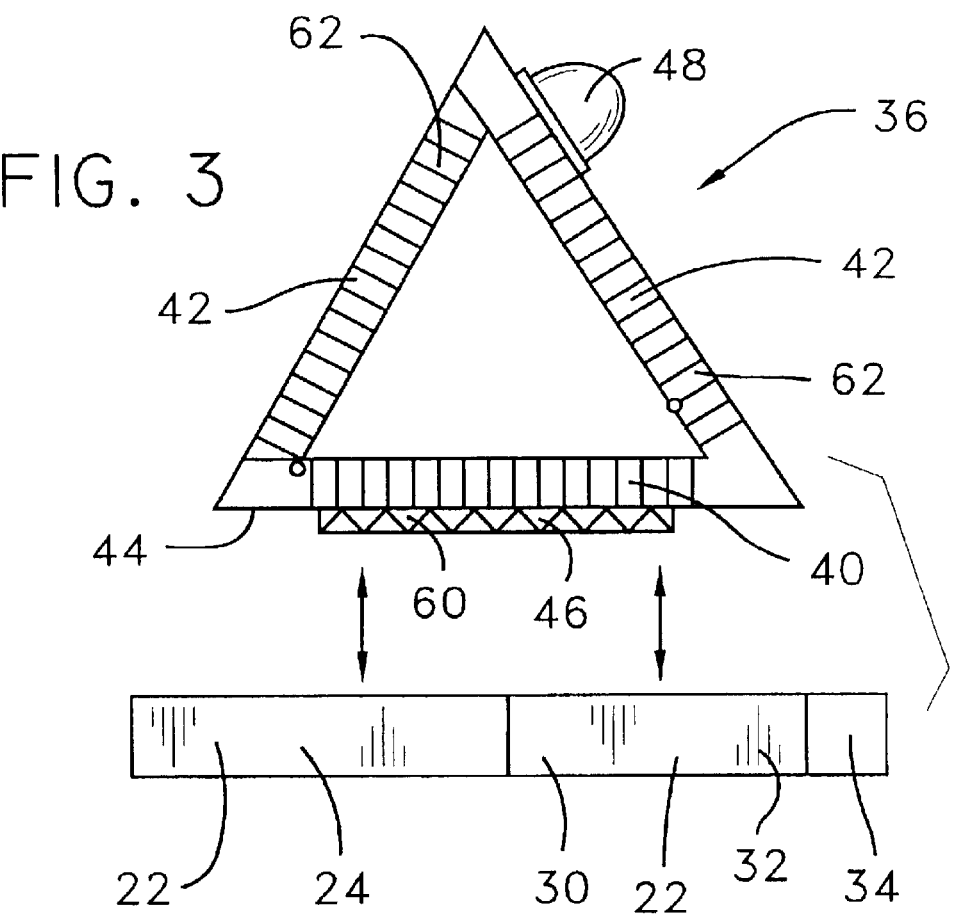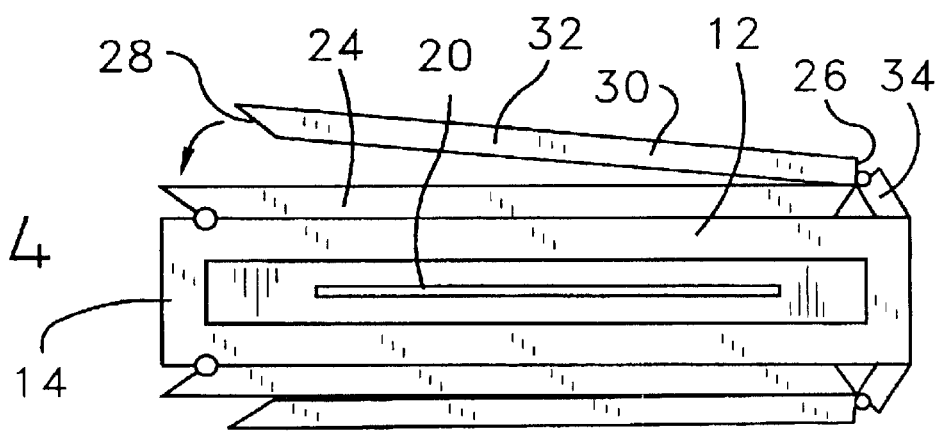

SAFETY STROBE LIGHT

BACKGROUND OF THE INVENTION

1. Field of the Invention

The present invention relates to emergency light devices and more particularly pertains to a new emergency light device for fulfilling the need for enhanced emergency signaling for motorists with disabled vehicles.

2. Description of the Prior Art

The use of emergency light devices is known in the prior art. U.S. Pat. No. 5,606,309 describes a device for use with an electrical system of a vehicle. Another type of emergency light devices is U.S. Pat. No. 5,315,777 having a foldable design made up of a number of flat sis joined by flexible hinges.

While these devices fulfill their respective, particular objectives and requirements, the need remains for a device has certain improved features such as a light, support base and battery.

SUMMARY OF THE INVENTION

The present invention meets the needs presented above by incorporating a base that would be attachable and designed to not be blown over by the wind. A light would be included for enhancing visibility as reflective only signs depend on the angle to reflect back the light. A rechargeable battery and battery charger with a cigar light plug would be incorporated into the present invention to allow the sign to function independent of the vehicles battery.

Still yet another object of the present invention is to provide a new emergency light device that would prevent accidents and prevent the person from being struck while changing a flat tire or working beneath the hood.

Even still another object of the present invention is to provide a new emergency light device that would be easy to use, have a high visibility, and enhanced ability to preserve battery charge.

To this end, the present invention generally comprises a base that is elongated and has a top surface and a bottom surface. The base has a pair of oppositely positioned side edges, the top surface has an elongated slot therein orientated generally parallel to the side edges. A light support includes a bottom section that has a lower side that has an elongated ridge thereon. The ridge is removably positionable into the slot for supporting the light support on the base in an upright manner. A strobe light is attached to the light support. A power supply is positioned in the light support and is electrically coupled to the strobe light. The power supply is electrically coupled to an electrical conduit on the ridge. A recharging station is adapted for receiving the ridge for recharging the power supply.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of the present invention.

FIG. 4 is a top view of the present invention.

DESCRIPTION OF THE PREFERRED EMBODIMENT

Figure 1:
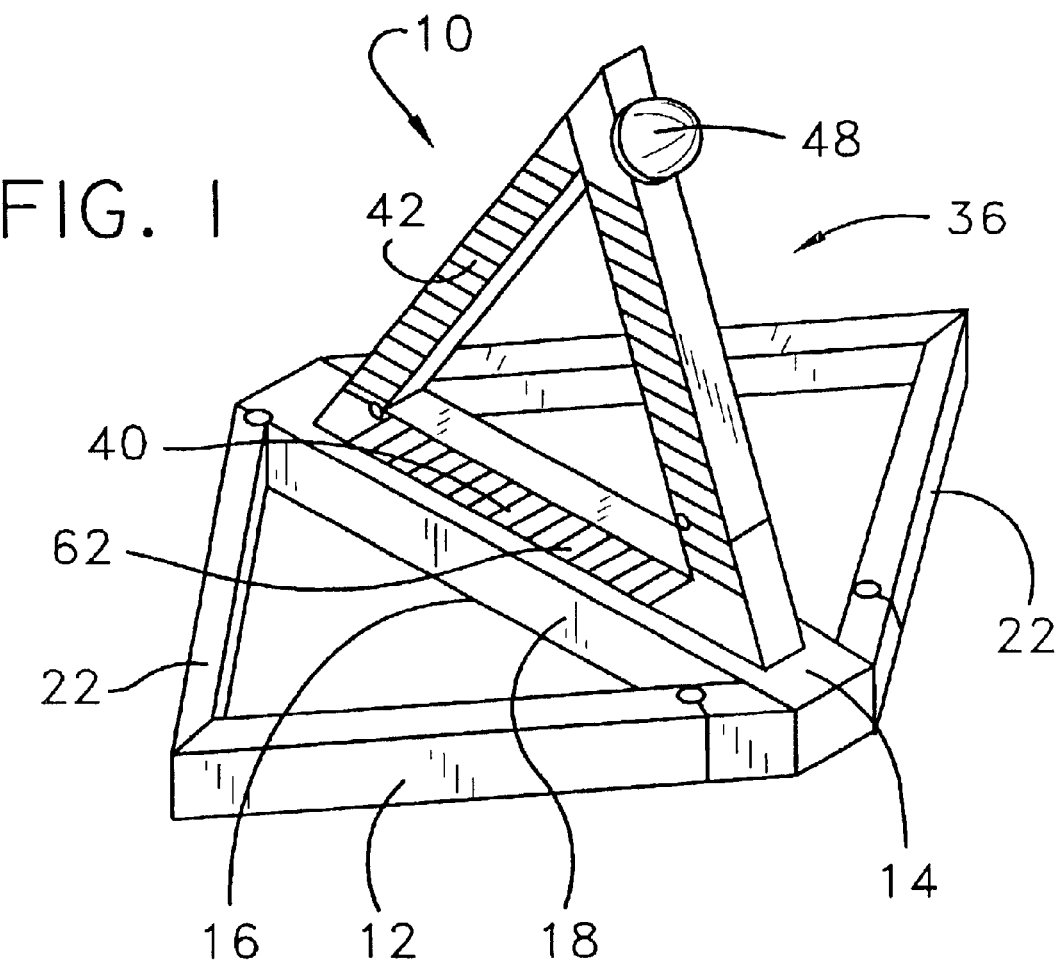
FIG. 1 is a perspective view of a new emergency light device according to the present invention.
Figure 2:
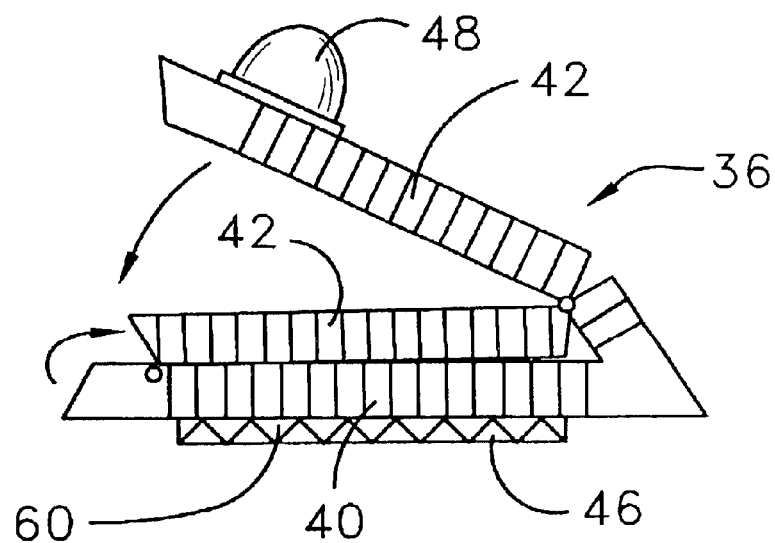
FIG. 2 is a side view of the present invention.
Figure 5:
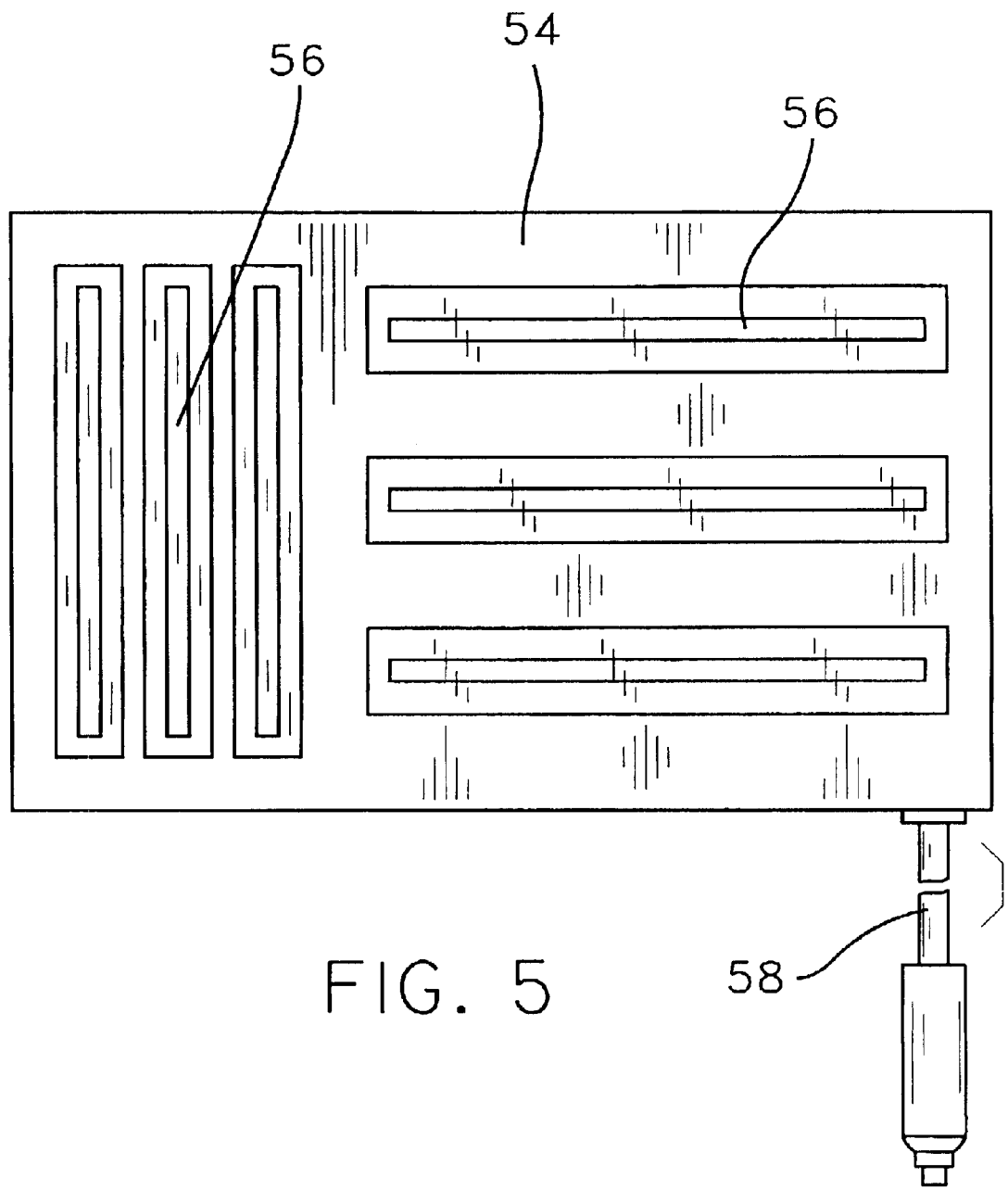
FIG. 5 is a top view of the present invention.
Figure 6:
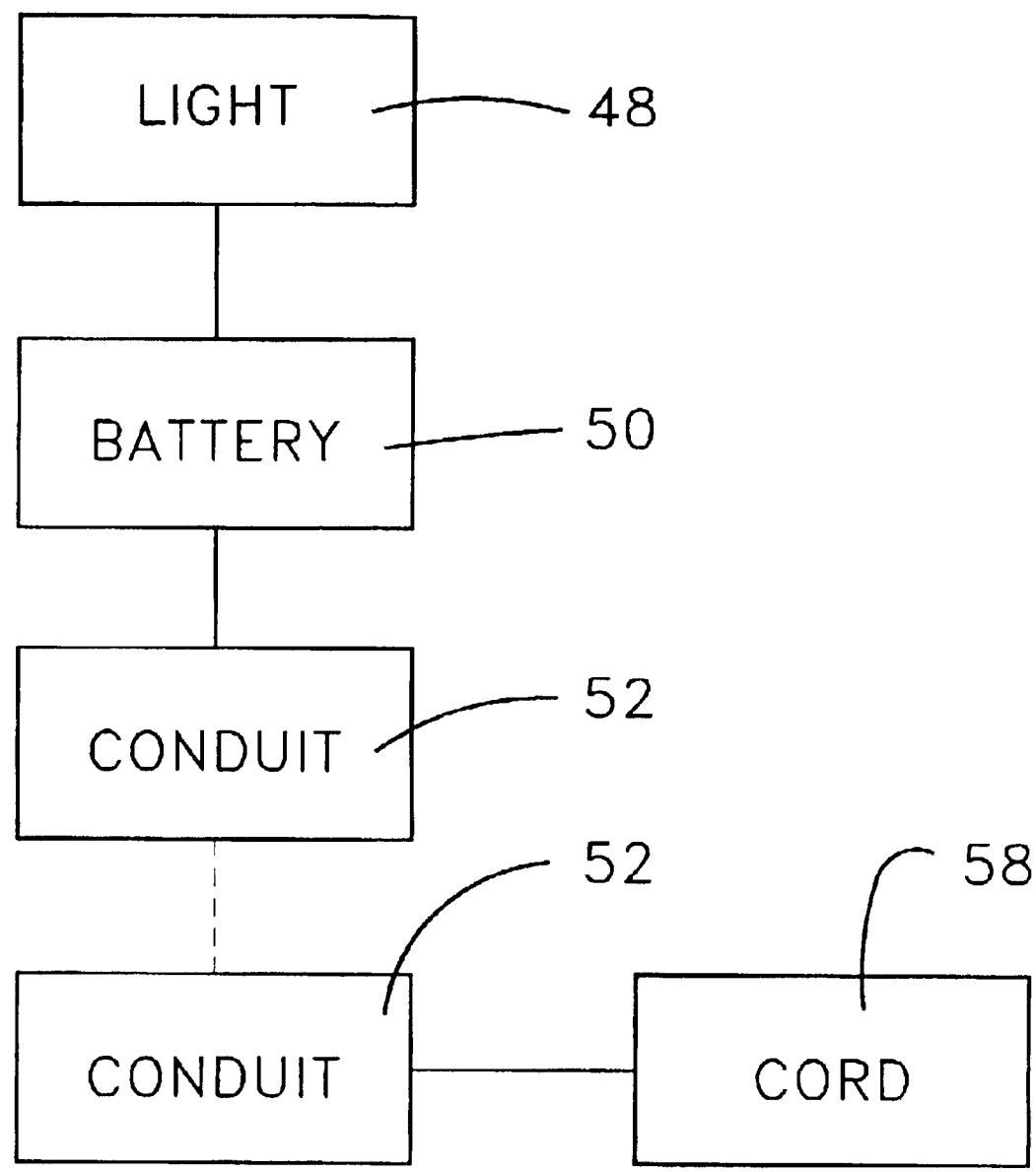
FIG. 6 is a block-diagram view of the present invention.

With reference now to the drawings, and in particular to FIGS. 1 through 6 thereof, a new emergency light device embodying the principles and concepts of the present invention and generally designated by the reference numeral 10 will be described.

As best illustrated in FIGS. 1 through 6, the emergency light device 10 generally includes a base 12 that is elongated and has a top surface 14 and a bottom surface 16. The base 12 has a pair of oppositely positioned side edges 18. The top surface 14 has an elongated slot 20 therein orientated generally parallel to the side edges 18. A pair of base supports 22 for supporting the base 12 such that the top surface 14 faces upward, each of the base supports 22 is attached to one of the side edges 18. Each of base supports 22 includes a first arm 24 that has first end 26 and a second end 28. The first end 26 is pivotally attached to the side edge 18 adjacent to an end of the side edge 18 and is pivotal within a plane of the base 12. The first arm 24 is pivotally moveable between a position adjacent to the base 12 and sixty degrees away from the base 12. A second arm 30 has first end 26 and a second end 28. The first end 26 is attached to the side edge 18 adjacent to an end of the side edge 18 opposite of the first end 26 of the first arm 24. The second arm 30 has a break therein nearer the first end 26 than the second end 28 such that a first 32 and second 34 portion of the second arm 30 is defined. The first portion 32 is pivotally coupled to the second portion 34. The second portion 34 is pivotal within a plane of the base 12. The first arm 24 is pivotally moveable between a position adjacent to the first arm 24 when the first arm 24 is adjacent to the base 12 and a position sixty degrees away from the base 12 such that a triangle is formed by the base 12, the first arm 24 and second arm 30.

A light support 36 includes a generally upright member 38 that has a bottom section 40 and a pair of legs 42 wherein the bottom section 40 and the legs 42 form a triangular shaped light support 36. The light support 36 has a reflective material 62 thereon. Each of the legs 42 is hingedly coupled to the bottom section 40 such that the light support 36 may be selectively positioned between an upright position and a collapsed position. The bottom section 40 has a lower side 44 that has an elongated ridge 46 thereon. The ridge 46 is removably positionable into the slot 20 for supporting the light support 36 on the base 12 in an upright manner.

A strobe light 48 is attached to the light support 36. The strobe light 48 is poisoned on one of the legs 42. A power supply is positioned in the light support 36 and is electrically coupled to the strobe light 48. The power supply includes a rechargeable battery 50. The power supply is electrically coupled to an electrical conduit 52 on the ridge 46.

A recharging station 54 has a plurality of channels 56 therein for receiving the ridge 46. Each of the channels 56 has an electrical conduit 52 therein. An electrical cord 58 is electrically coupled to the electrical conduits 52 in the channels 56. Wherein the electrical contact on the ridge 46 is abuttable against one of the electrical contacts 60 when the ridge 46 is positioned in one of the channels 56.

In use, the user would place the base on the road edge so that triangle can e inserted and held in an upright position for display to approaching motorists. The light would then be activated to provide maximum visibility to approaching motorists. When not in use the present invention would be folded up and inserted into the charging stand.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An emergency light device comprising:
    a base being elongated and having a top surface and a bottom surface, said base having a pair of oppositely positioned side edges, said top surface having an elongated slot therein orientated generally parallel to said side edges;
    a light support including a bottom section having a lower side having an elongated ridge thereon, said ridge being removably positionable into said slot for supporting said light support on said base in an upright manner;
    a strobe light being attached to said light support, a power supply being positioned in said light support and being electrically coupled to said strobe light, said power supply being electrically coupled to an electrical conduit on said ridge; and
    a recharging station being adapted for receiving said ridge for recharging said power supply.

2. The emergency light device as in claim 1, further including a pair of base supports for supporting said base such that said top surface faces upward, each of said base supports being attached to one of said side edges.

3. The emergency light device as in claim 2, wherein each of base supports including:
    a first arm having first end and a second end, said first end being pivotally attached to said side edge adjacent to an end of said side edge and being pivotal within a plane of said base, said first arm being pivotally moveable between a position adjacent to said base and sixty degrees away from said base; and
    a second arm having first end and a second end, said first end being attached to said side edge adjacent to an end of said side edge opposite of said first end of said first arm, said second arm having a break therein nearer said first end than said second end such that a first and second portion of said second arm is defined, said first portion being pivotally coupled to said second portion, said second portion being pivotal within a plane of said base, said first arm being pivotally moveable between a position adjacent to said first arm when said first arm is adjacent to said base and a position sixty degrees away from said base such that a triangle is formed by said base, first arm and second arm.

4. The emergency light device as in claim 1, wherein said light support includes a pair of legs attached to said bottom section wherein said bottom section and said legs form a triangular shaped light support, said strobe light being attached to one of said legs.

5. The emergency light device as in claim 4, wherein each of said legs are hingedly coupled to said bottom section such that said light support may be selectively positioned between an upright position and a collapsed position.

6. The emergency light device as in claim 1, wherein said recharging station has a plurality of channels therein for receiving said ridge, each of said channels having an electrical conduit therein, an electrical cord being electrically coupled to said electrical conduits in said channels, wherein said electrical contact on said ridge is abuttable against one of said electrical contacts when said ridge is positioned in one of said channels, wherein a plurality of bases and a plurality of light supports each having a strobe light thereon is provided.

7. An emergency light device comprising:
    a base being elongated and having a top surface and a bottom surface, said base having a pair of oppositely positioned side edges, said top surface having an elongated slot therein orientated generally parallel to said side edges;
    a pair of base supports for supporting said base such that said top surface faces upward, each of said base supports being attached to one of said side edges, each of base supports including;
    a first arm having first end and a second end, said first end being pivotally attached to said side edge adjacent to an end of said side edge and being pivotal within a plane of said base, said first arm being pivotally moveable between a position adjacent to said base and sixty degrees away from said base;
    a second arm having first end and a second end, said first end being attached to said side edge adjacent to an end of said side edge opposite of said first end of said first arm, said second arm having a break therein nearer said first end than said second end such that a first and second portion of said second arm is defined, said first portion being pivotally coupled to said second portion, said second portion being pivotal within a plane of said base, said first arm being pivotally moveable between a position adjacent to said first arm when said first arm is adjacent to said base and a position sixty degrees away from said base such that a triangle is formed by said base, first arm and second arm;
    a light support comprising a generally upright member having a bottom section and a pair of legs wherein said bottom section and said legs form a triangular shaped light support, each of said legs being hingedly coupled to said bottom section such that said light support may be selectively positioned between an upright position and a collapsed position, said bottom section having a lower side having an elongated ridge thereon, said ridge being removably positionable into said slot for supporting said light support on said base in an upright manner;
    a strobe light being attached to said light support, said strobe light being poisoned on one of said legs, a power supply being positioned in said light support and being electrically coupled to said strobe light, said power supply comprising a rechargeable battery, said power supply being electrically coupled to an electrical conduit on said ridge; and a recharging station having a plurality of channels therein for receiving said ridge, each of said channels having an electrical conduit therein, an electrical cord being electrically coupled to said electrical conduits in said channels, wherein said electrical contact on said ridge is abuttable against one of said electrical contacts when said ridge is positioned in one of said channels.

* * * * *